Figure 1:
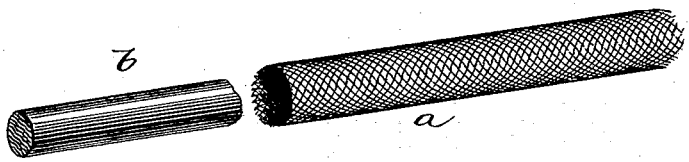

(No Model.)

J. B. ENTZ & W. A. PHILLIPS.
METHOD OF MAKING ELECTRODES FOR SECONDARY BATTERIES.

No. 440,024. Patented Nov. 4, 1890.

WITNESSES:

INVENTORS:
Justus B. Entz,
William A. Phillips.
BY

ATTORNEY.

UNITED STATES PATENT OFFICE.

JUSTUS B. ENTZ, OF NEW YORK, AND WILLIAM A. PHILLIPS, OF BROOKLYN, ASSIGNORS TO THE WADDELL-ENTZ ELECTRIC COMPANY, OF NEW YORK, N. Y.

METHOD OF MAKING ELECTRODES FOR SECONDARY BATTERIES.

SPECIFICATION forming part of Letters Patent No. 440,024, dated November 4, 1890.

Application filed July 12, 1890. Serial No. 358,535. (No model.)

*To all whom it may concern:*

Be it known that we, JUSTUS B. ENTZ, a citizen of the United States, residing in the city, county, and State of New York, and WILLIAM A. PHILLIPS, a subject of the Queen of Great Britain, residing in Brooklyn, in the county of Kings and State of New York, have invented certain new and useful Improvements in Electric Batteries, of which the following is a specification.

Our invention relates more particularly to secondary or storage batteries, but also has reference to primary batteries. More specifically stated, the invention relates to those batteries in which the oxide of copper forms a part, whether in the capacity of a depolarizing agent, as in primary batteries, or as the active material in the positive electrode of a secondary battery.

In the use of copper oxide for batteries trouble has arisen from the fact that it is not sufficiently coherent to hold together. The object of our invention is to provide a process whereby the oxide of copper may be rendered a strongly coherent mass.

Our invention consists in combining with oxide of copper a small portion of sulphur and then heating the mixture. The sulphur is thoroughly mixed with the oxide and then applied to the support, which in this instance is a woven copper wire structure, as hereinafter described. The whole thing is then heated to burn off the sulphur, but in so doing the oxygen of the oxide of copper is absorbed to form the $SO_2$, leaving the oxide in a reduced or partially-reduced state on the support. The heating then being continued, the exposed portions of the particles of the mass are reoxidixed, while the unexposed portions at the juncture being protected from the air remain metallic and serve to hold the mass together. The sulphur, when used in this manner, therefore acts as a binding, toughening, or hardening agent without being actually present in the mass after the treatment.

We do not confine ourselves to the use of pure sulphur, as we have found that the sulphite of copper may be added to the oxide and good results obtained; or the sulphite of copper alone may be heated in the open air until the sulphur is burned off and the copper is oxidized, forming oxide of copper. The oxide of copper thus formed has about the same consistency and qualities as the resultant mass of the first process above mentioned. If desired, the heating or burning off may take place before the mass is applied to a support or molded into its final form.

Figure 2:
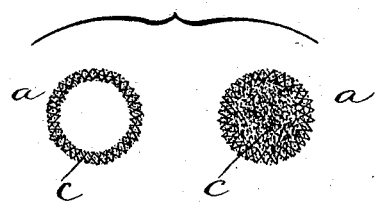
Figure 2:

In the drawings, Figure 1 represents a tube made of woven wire and the core over which it is formed, and Fig. 2 represents a transverse section of the tube with the active material in place.

*a* represents the woven-wire support, and *b* the core over which it is formed, while *c* represents the active material.

Having thus described our invention, we claim—

1. In the manufacture of electric batteries, the process of treating the oxide of copper, which consists in mixing therewith a portion of sulphur or a sulphur compound, and then heating the mixture until the sulphur is driven off.

2. In the manufacture of electric batteries, the process of treating the oxide of copper, which consists in adding thereto a portion of sulphur and then heating the mixture until the sulphur is driven off and the exposed particles of the remaining mass become reoxidized.

3. The process of manufacturing an element for an electric battery, consisting in mixing sulphur or a sulphur compound with oxide of copper, then heating the mixture, and then molding and pressing the mass into a definite shape.

In witness whereof we have signed our names in the presence of two subscribing witnesses.

JUSTUS B. ENTZ.
WILLIAM A. PHILLIPS.

Witnesses:
MONTGOMERY WADDELL,
THOS. H. FOOTE.